United States Patent
Mihira

(10) Patent No.: US 10,728,936 B2
(45) Date of Patent: Jul. 28, 2020

(54) MOBILE TERMINAL AND METHOD OF CONTROLLING MOBILE TERMINAL

(71) Applicant: CANON KABUSHIKI KAISHA, Tokyo (JP)

(72) Inventor: Yoshiro Mihira, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/658,634

(22) Filed: Jul. 25, 2017

(65) Prior Publication Data
US 2018/0035480 A1 Feb. 1, 2018

(30) Foreign Application Priority Data

Jul. 28, 2016 (JP) ................. 2016-148703

(51) Int. Cl.
| | |
|---|---|
| *H04W 76/14* | (2018.01) |
| *H04W 4/80* | (2018.01) |
| *H04W 76/11* | (2018.01) |
| *H04W 4/02* | (2018.01) |
| *H04W 68/00* | (2009.01) |
| *G06F 3/12* | (2006.01) |
| *H04N 1/00* | (2006.01) |
| *H04W 76/18* | (2018.01) |
| *H04L 29/12* | (2006.01) |
| *H04W 84/12* | (2009.01) |
| *H04W 88/08* | (2009.01) |

(52) U.S. Cl.
CPC .......... *H04W 76/14* (2018.02); *G06F 3/1203* (2013.01); *G06F 3/1204* (2013.01); *G06F 3/1236* (2013.01); *G06F 3/1286* (2013.01); *G06F 3/1292* (2013.01); *H04N 1/00307* (2013.01); *H04W 4/023* (2013.01); *H04W 4/80* (2018.02); *H04W 68/005* (2013.01); *H04W 76/11* (2018.02); *H04L 61/2007* (2013.01); *H04N 2201/006* (2013.01); *H04N 2201/0036* (2013.01); *H04N 2201/0094* (2013.01); *H04W 76/18* (2018.02); *H04W 84/12* (2013.01); *H04W 88/08* (2013.01)

(58) Field of Classification Search
CPC ....... H04W 75/14; H04W 4/80; H04W 76/11; H04W 4/023; H04W 68/005; G06F 3/1203; G06F 3/1204; G06F 3/1236; G06F 3/1286; G06F 3/1292; H04N 1/00307

See application file for complete search history.

(56) References Cited

U.S. PATENT DOCUMENTS

| | | | |
|---|---|---|---|
| 2013/0225282 A1* | 8/2013 | Williams | ............... A63F 13/216 463/29 |
| 2018/0015755 A1* | 1/2018 | Yamada | ................ G06F 3/1236 |

FOREIGN PATENT DOCUMENTS

JP 2013-157736 A 8/2013

* cited by examiner

*Primary Examiner* — Ronald B Abelson
(74) *Attorney, Agent, or Firm* — Canon U.S.A., Inc., IP Division

(57) ABSTRACT

A mobile terminal, which has acquired communication information from an external device, using proximity wireless communication attempts connection to the external device based on the acquired communication information. If the connection attempt to the external device fails, the mobile terminal determines whether to display a message prompting a user to use a direct connection function of the external device while displaying a message notifying failure of the connection attempt.

15 Claims, 12 Drawing Sheets

EXAMPLE OF SCREEN TO READ NFC TAG

EXAMPLE OF ERROR SCREEN

EXAMPLE OF ERROR SCREEN (B)

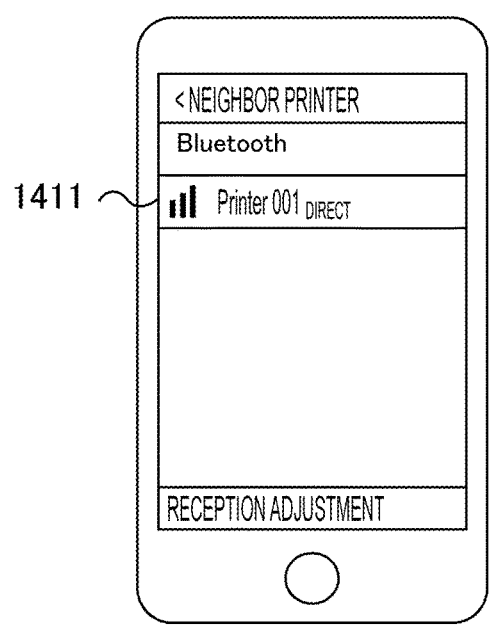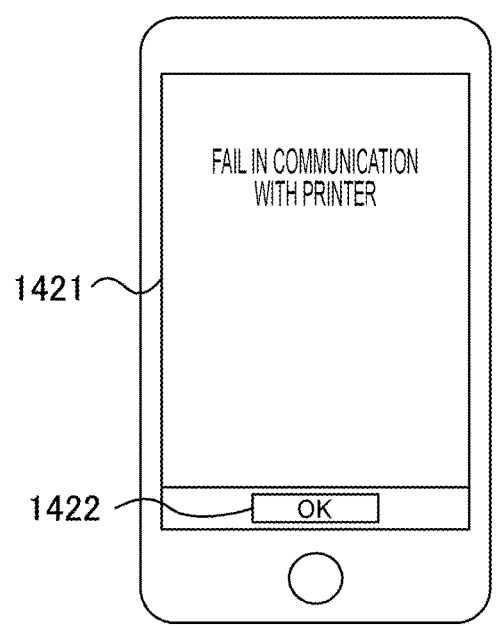
FIG. 13A
FIG. 13B

MOBILE TERMINAL AND METHOD OF CONTROLLING MOBILE TERMINAL

BACKGROUND

Field

The present disclosure relates to a mobile terminal that executes proximity wireless communication.

Description of the Related Art

As a technology to perform wireless communication, there is a technology in which an information processing device itself serves as a wireless base station and is wirelessly directly connected with a mobile terminal. Here, the wireless direct connection is temporal connection, and thus an ID (service set identifier (SSID)) or a Passkey for Wi-Fi® connection are temporal values and are often different in every connection. Therefore, the mobile terminal needs to input the values to get connected every time the mobile terminal performs the wireless direct connection.

Japanese Patent Laid-Open No. 2013-157736 discloses a method of causing a user to attach a near field communication (NFC) tag in which ID/Passkey are stored to an information processing device without manually inputting the ID/Passkey on a mobile terminal, prompting the user to touch the NFC tag with the mobile terminal to recognize the NFC tag, and setting the ID/Passkey.

Consider a case in which the information processing device includes a wireless direct function, but the wireless direct function is not started and the information processing device is operated by wired LAN connection. In this case, the SSID/Passkey are not included in the NFC tag, and only an IP address of the information processing device is stored.

Consider a case in which a user does not know the SSID/Passkey of a wireless access point to which the information processing device is to be connected, and the information processing device cannot perform communication with the connected wireless access point. In this case, even if the mobile terminal cannot connect to the wireless access point, the mobile terminal can connect if the wireless direct function is started. However, when the user only performs NFC touch, the touch becomes a connection error to the information processing device, and the user is not informed whether the wireless direct function started.

SUMMARY

A mobile terminal includes a memory that stores a program and a processor that, when executing the program causes the mobile terminal to acquire communication information from an external device, attempt, using proximity wireless communication, to connect to the external device based on the acquired communication information, and determine, when the connection attempt fails, whether to prompt a user to use a direct connection function of the external device based on the acquired communication information.

Further features will become apparent from the following description of exemplary embodiments with reference to the attached drawings.

BRIEF DESCRIPTION OF THE DRAWINGS

FIGS. 13A and 13B are diagrams illustrating examples of a screen of the mobile terminal of the second exemplary embodiment.

DESCRIPTION OF THE EMBODIMENTS

Figure 1:
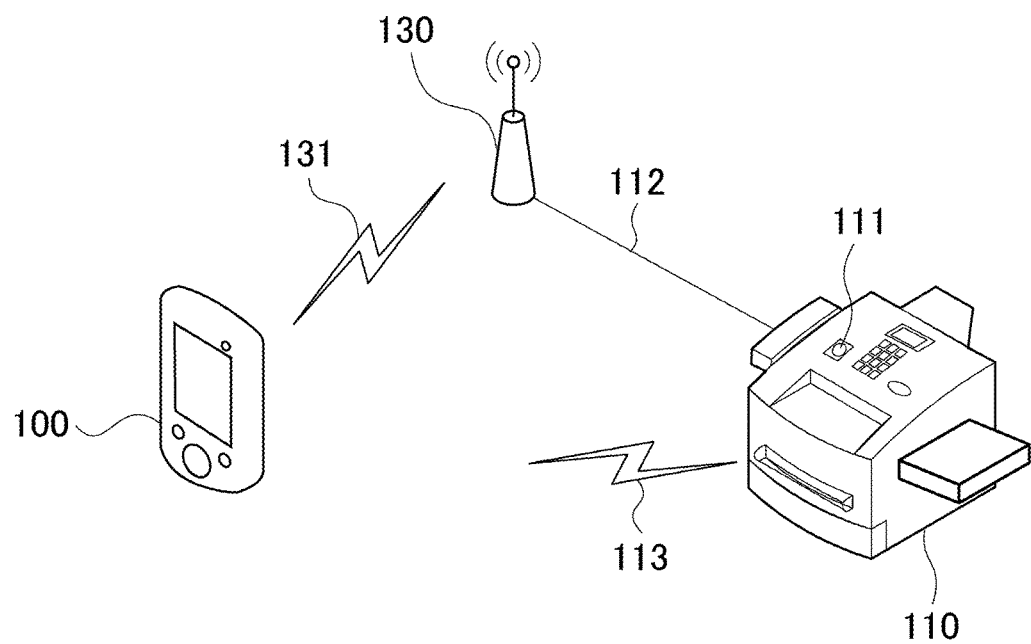
FIG. 1 is a diagram illustrating an example of a system configuration of a communication system of a first exemplary embodiment.

Hereinafter, exemplary embodiments will be described with reference to the drawings.

First Exemplary Embodiment

A system configuration of a communication system will be described using FIG. 1. The communication system includes a mobile terminal 100, a printing device 110, an NFC tag 111 attached to the printing device 110, and wired LAN connection 112 to which the printing device 110 is connected. The communication system also includes wireless direct connection 113 for which the printing device 110 works as a base station, a wireless access point 130, and wireless communication 131 from the wireless access point 130.

The printing device 110 is connected to the wireless access point 130 via the wired LAN connection 112, using a LAN cable and the like. The printing device 110 provides the wireless direct connection 113, where the printing device 110 itself serves as a wireless access point.

The mobile terminal 100 can execute wireless communication such as Wi-Fi®. A user inputs an SSID and a Passkey of the wireless access point 130 to the mobile terminal 100. With the input, the mobile terminal 100 can connect with the wireless access point 130 and the wireless direct connection 113 of the printing device 110. The mobile terminal 100 then transmits a search packet using the wireless communication to discover devices, such as the printing device 110 and the like, existing on a network. In addition, the mobile terminal 100 can perform communication with the printing device 110 through the wireless access point 130 or the wireless direct connection 113. The mobile terminal 100 can transmit a print job to an external device such as the printing device 110 through the wireless access point 130 or the wireless direct connection 113. The printing device 110 upon receipt of the print job executes printing of the print job.

The mobile terminal 100 and the printing device 110 can execute proximity wireless communication such as NFC or Bluetooth®. In the case of the present exemplary embodiment, the printing device 110 includes the NFC tag 111. The mobile terminal 100 can then read information (an IP address, a MAC address, a model name of the printing device 110 and the SSID and the Passkey of the wireless direct connection 113) for connecting with the printing device 110, where the information is stored in the NFC tag 111. Details of the information for connecting with the printing device 110 will be separately described with respect to Tables A and B.

Figure 2:
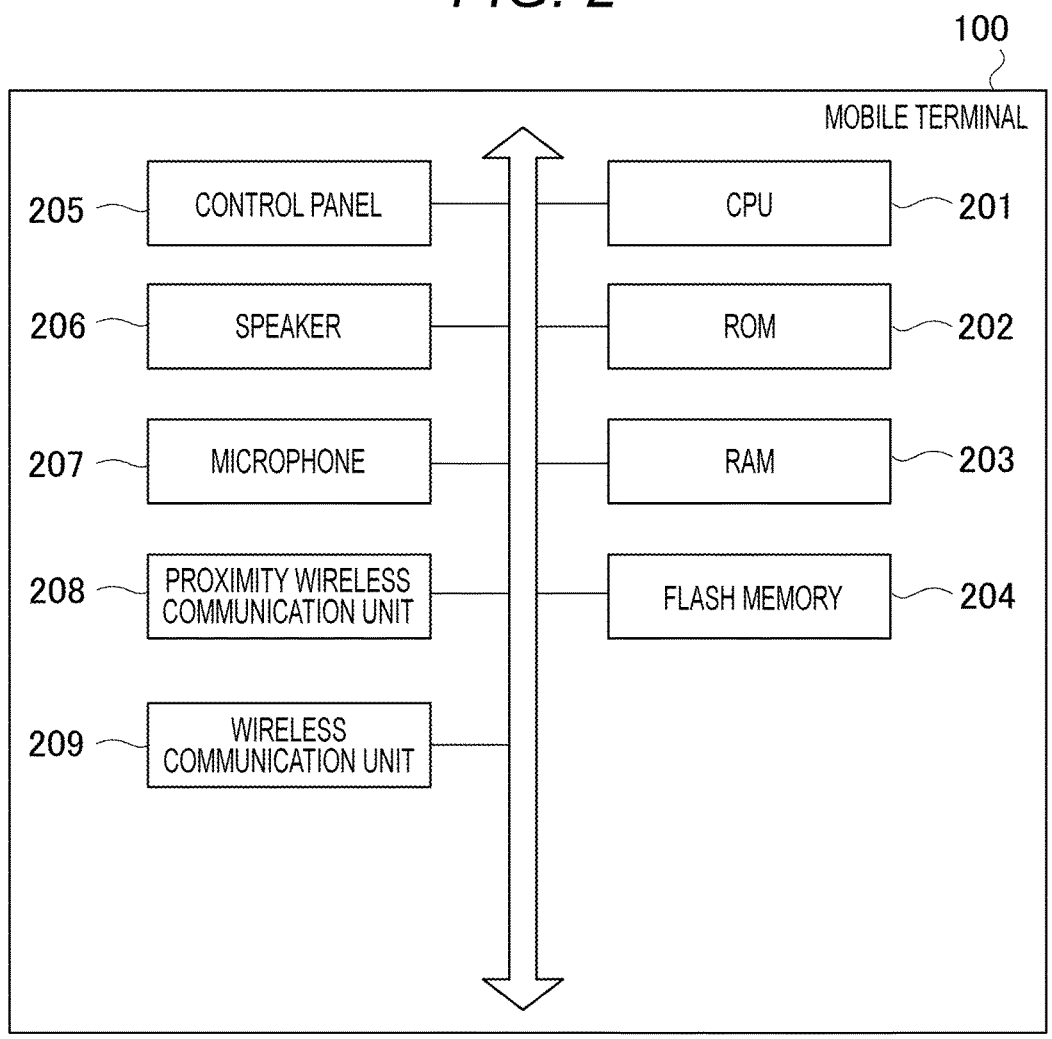
FIG. 2 is a diagram illustrating an example of a hardware configuration of a mobile terminal of the first exemplary embodiment.

Next, a hardware configuration of the mobile terminal 100 will be described using FIG. 2. The mobile terminal 100 of the present exemplary embodiment can be for example, a device such as a smart phone or a tablet PC. However, any device that is an information processing device that can execute wireless communication and read two-dimensional bar codes is applicable.

A CPU 201 reads a program stored in a ROM 202, and executes various types of processing for controlling an operation of the mobile terminal 100. The ROM 202 stores the program. A RAM 203 is used as a main memory of the CPU 201 and a temporary storage area such as a work area. A flash memory 204 stores various data such as pictures and electronic documents. A program of an operating system (OS) 302 and a program of a printing device application 301 described below are also stored in the flash memory 204.

In the present specification, a software configuration of the mobile terminal 100 and processing illustrated by flowcharts of FIGS. 6 and 12 described below are executed when the one CPU 201 executes the various types of processing based on the program stored in the ROM 202. However, another mode can be employed. For example, a plurality of CPUs can execute the processing in cooperation based on the program stored in the ROM 202 to execute the software configuration of the mobile terminal 100 and the processing illustrated by flowcharts of FIGS. 6 and 12 described below.

A control panel 205 includes a touch panel function to detect a touch operation of a user. The control panel 205 then displays various screens provided by the OS 302 and applications. The user inputs the touch operation on the control panel 205 to input a desired operating instruction to the CPU 201 of the mobile terminal 100. The mobile terminal 100 can include a hardware key, and the user can input the operating instruction to the mobile terminal 100 using the hardware key. A speaker 206 and a microphone 207 are used by the user to make phone calls.

A proximity wireless communication unit 208 executes NFC proximity wireless communication. In the case of the present exemplary embodiment, the printing device 110 includes the NFC tag. When the user brings the mobile terminal 100 in proximity to the NFC tag 111 of the printing device 110, the proximity wireless communication is established between the proximity wireless communication unit 208 and the NFC tag 111 of the printing device 110. In addition, the proximity wireless communication unit 208 can acquire information of the NFC tag.

A wireless communication unit 209 executes wireless communication such as Wi-Fi®. The mobile terminal 100 transmits a search packet from the wireless communication unit 209 to search for and discover the printing device 110 with which the mobile terminal 100 can perform communication through the wireless access point 130. In the case of the mobile terminal 100, the user can realize the wireless communication via the wireless communication unit 209 with a simple operation by using handover. More specifically, the wireless communication unit 209 can connect with the wireless direct connection 113 using connection information (the SSID and the Passkey of the wireless direct connection 113) acquired by the proximity wireless communication unit 208 from the NFC tag 111 of the printing device 110.

Figure 3:
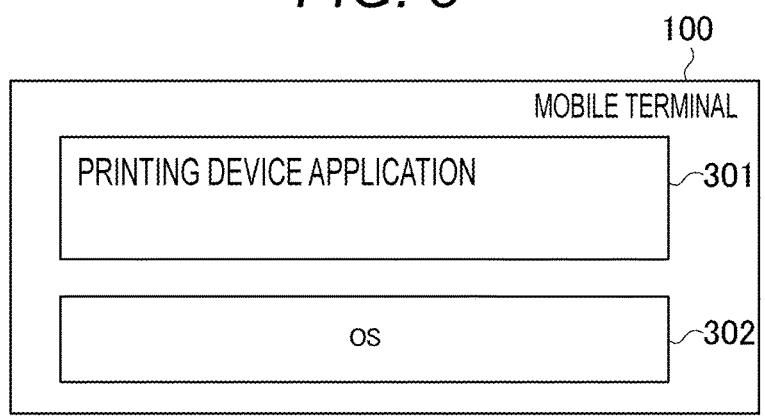
FIG. 3 is a diagram illustrating an example of a software configuration of the mobile terminal of the first exemplary embodiment.

Next, a software configuration of the mobile terminal 100 will be described using FIG. 3.

The OS 302 is software for controlling the entire operation of the mobile terminal 100. Various applications including the printing device application 301 described below can be installed in the mobile terminal 100. The OS 302 exchanges information with the applications and changes the screens to be displayed on the control panel 205 according to instructions received from the applications. In addition, the OS 302 executes the wireless communication by the proximity wireless communication unit 208 and the wireless communication unit 209.

The printing device application 301 is an application installed in the mobile terminal 100. The printing device application 301 is an application to search for the printing device 110, using the proximity wireless communication unit 208, and to be connected with the printing device 110 and perform print processing, using the information for performing communication with the printing device 110, the information being written in the NFC tag 111. Various applications other than the printing device application 301 are installed in the mobile terminal 100. Their descriptions are omitted.

Next, a hardware configuration of the printing device 110 will be described using FIG. 4.

Figure 4:
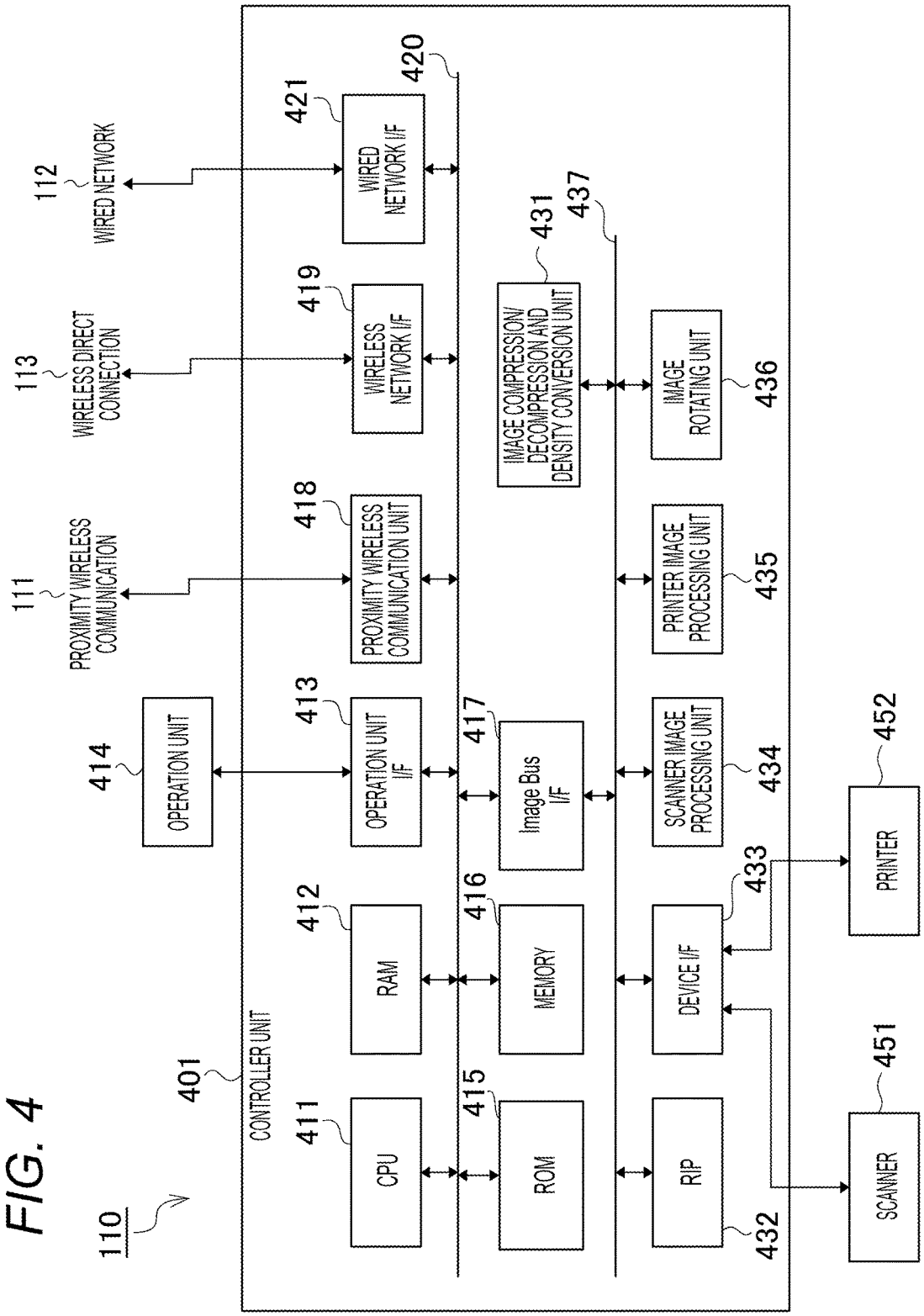
FIG. 4 is a diagram illustrating an example of a hardware configuration of a printing device of the first exemplary embodiment.

In FIG. 4, a controller unit 401 of the printing device 110 is connected with a scanner 451 as an image input device that reads an image of a document and the like and inputs image data, and a printer 452 as an image output device. The controller unit 401 performs communication with the mobile terminal 100 illustrated in FIG. 1 through the wireless access point 130 or the wireless direct connection 113. The controller unit 401 is a controller for inputting/outputting image information and device information with the aforementioned devices.

A CPU 411 controls the entire system in the printing device 110 of FIG. 1. A RAM 412 is a system work memory for an operation of the CPU 411, and is also an image memory for temporarily storing the image data. A ROM 415 is a boot ROM in which a boot program of the system of the printing device 110 is stored.

A memory 416 is a hard disk drive of the printing device 110. Programs of system software and application software illustrated in FIG. 5 and the image data are stored in the memory 416. The print job received from the mobile terminal 100 is stored in an image data storage area of the memory 416.

An operation unit I/F 413 is an interface unit between the controller unit 401 and an operation unit 414, and outputs the image data to be displayed in the operation unit 414 to the operation unit 414. The operation unit I/F 413 includes a function to transfer information input by the user of the printing device 110 from the operation unit 414 to the CPU 411.

A proximity wireless communication unit 418 is the NFC tag 111, and can perform the proximity wireless communication with the mobile terminal 100. A wired network I/F 421 is connected with the wired LAN connection 112, and inputs/outputs information to/from the mobile terminal 100 from the wired network. A wireless network I/F 419 corresponds to the wireless direct connection 113, performs communication with a wireless network, and inputs/outputs information to/from the mobile terminal 100.

An image bus I/F 417 is a bus bridge that converts a data structure and is connected with a system bus 420 and an image bus 437 that transfers the image data at a high speed. The image bus 437 is a PCI bus or IEEE 1394. A raster image processor (RIP) 432, a device I/F 433, a scanner image processing unit 434, a printer image processing unit 435, an image rotating unit 436, and an image compression/decompression and density conversion unit 431 are connected to the image bus 437.

The RIP 432 rasterizes a PDL code into a bitmap image. The device I/F 433 connects the scanner 451 and the printer 452 with the controller unit 401. The scanner image processing unit 434 corrects, modifies, and edits the image data input from the scanner 451. The printer image processing unit 435 performs print correction, resolution conversion, and the like for the image data to be output to the printer 452. The image rotating unit 436 rotates the image data. The image compression/decompression and density conversion unit 431 convers multi-level image data into JPEG data, and performs JBIG, MMR, or MH compression/decompression processing for binary image data.

Figure 5:
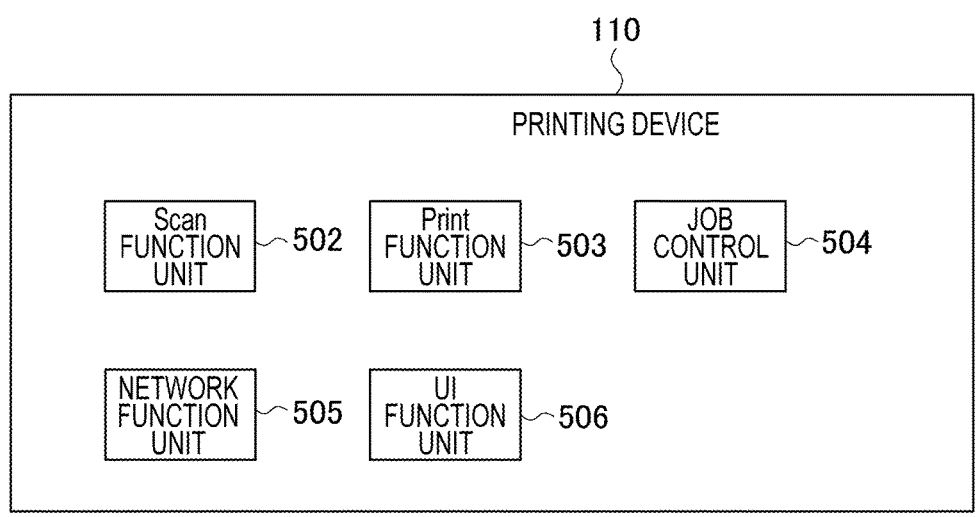
FIG. 5 is a diagram illustrating an example of a software configuration of the printing device of the first exemplary embodiment.

Next, a software configuration of the printing device 110 will be described using FIG. 5.

A scan function unit 502 provides a scan function using the scanner 451. The scan function unit 502 includes a function to read a paper document and convert read image data into binary or multi-level image data. The scan function unit 502 includes a function to output the image data to the printer 452, adding a command directed to the printer 452 to the image read by the scan function unit 502.

A job control function unit 504 queues the image data received from the scan function unit 502 as print jobs, and sequentially outputs the image data to the print function unit 503 or a network function unit 505 described below.

The network function unit 505 includes various network protocol functions such as TCP/IP, HTTP, FTP, LDAP, SNMP, SMTP, SSL, and SMB. The network function unit 505 can receive the print job from the mobile terminal 100 through the wired LAN connection 112 or the wireless network.

A user interface (UI) function unit 506 manages input/output by the user of the operation unit 414 of the printing device 110. In addition, the UI function unit 506 displays an input field, an output message field, and the like on the operation unit 414, receives an input value to the input field from the user, and notifies the input value to other function units. The UI function unit 506 also includes a function to display a message to the user from another function unit on a screen designed in advance. The UI function unit 506 can store the connection information (the IP address of the printing device 110 and the SSID and the Passkey of the wireless direct connection 113) based on an operation mode of the network function unit 505 to the proximity wireless communication unit 418 as the NFC tag 111.

Figure 6:
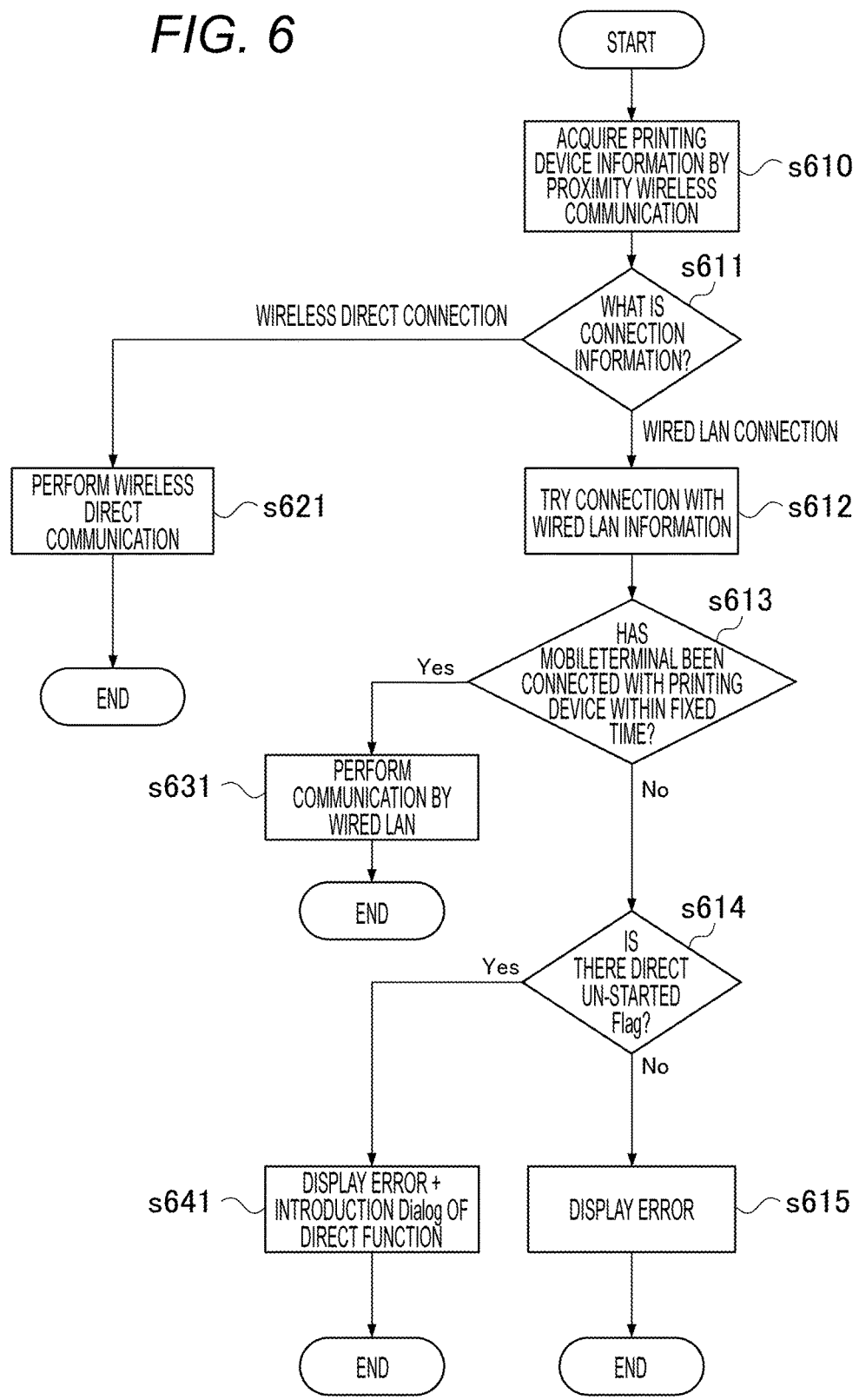
FIG. 6 is a flowchart illustrating an example of information processing of the mobile terminal of the first exemplary embodiment.
Figure 7A:
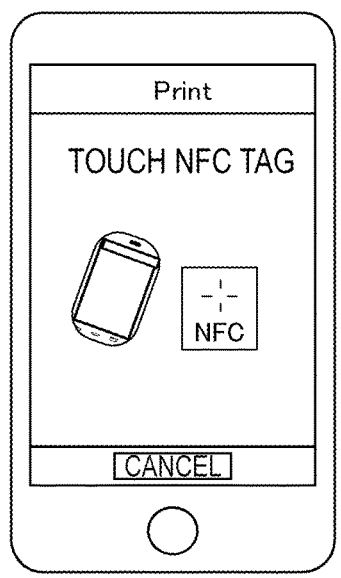
FIGS. 7A to 7C are diagrams illustrating examples of a screen of the mobile terminal of the first exemplary embodiment.

FIG. 6 is a flowchart illustrating an example of information processing of touching the NFC tag 111 of the printing device 110 with the mobile terminal 100 and attempting connection to the printing device 110 in the first exemplary embodiment. When a print operation or the like is performed by the user, the CPU 201 displays the screen illustrated in FIG. 7A on the control panel 205. The user touches the NFC tag 111 of the printing device 110 with the mobile terminal 100 based on an instruction on the screen of FIG. 7A. In step s610, the CPU 201, using the proximity wireless communication unit 208, reads the information stored in the NFC tag 111 of the printing device 110 and analyzes the read information. In the NFC tag 111, information as illustrated in Tables A and B below is stored as information for being handed over to the printing device 110.

The format of the NFC tag 111 read by the CPU 201 in step s610 will be described. There are two types of format as illustrated in Tables A and B. Table A is a case in which the printing device 110 is connected by the wired LAN connection 112, and the wireless direct connection 113 is not started. Table B is a case in which the printing device 110 has started the wireless direct connection 113.

First, the first item in Table A is start application information, and an application name that is started when the mobile terminal 100 is brought to touch the NFC tag 111 is written. The case of Table 1 indicates that an NFC linkage print application named com.example.printapp is started. The second item is a record of a MAC address as network connection information, and indicates the MAC address of the printing device 110. In the present exemplary embodiment, only the MAC address is written. However, a combination of information that can discriminate the printing device 110, such as an IP address and a universally unique identifier (UUID) can be written. The third item is a record in which printing device name information is stored. In the present exemplary embodiment, Printer 01 is stored as the printing device name. The fourth item is a dmode portion described below. Here, a value of either 1 or 0 is input.

TABLE 1

| Table A | |
| --- | --- |
| NFC Tag information | Value |
| 1. Start application information | com.example.printapp |
| 2. Network connection information | MAC: 1c-3e-fc-4e-45-db |
| 3. Printing device name information | Printer01 |
| 4. dmode | 1 |

Next, among the items in Table B, 1. Start application information, 3. Network connection information, and 4. Printing device name information are the same as the respective records in Table A. An item included in Table B and not included in Table A is Wi-Fi® connection information configured from the SSID of the wireless direct connection 113 that can be connected with the printing device 110 and Password information. In addition, dmode is not included in Table B. This is because the format already indicates the wireless direct connection information. NFC Tag information corresponding to Table A and NFC Tag information corresponding to Table B are different formats.

TABLE 2

Table B

| NFC Tag information | Value |
|---|---|
| 1. Start application information | com.example.printapp |
| 2. Wi-Fi connection information | SSID:AP-NRT-01 |
| | Password: ADC1AD099.. |
| 3. Network connection information | MAC: 1c-3e-fc-4e-45-db |
| 4. Printing device name information | Printer01 |

In step s611, the CPU 201 determines whether the printing device 110 is connected by the wired LAN connection 112 or the wireless direct connection 113 from the printing device information (connection information) acquired in step s610. More specifically, the CPU 201 determines that the connection is the wireless direct connection 113 when the SSID/Passkey of the wireless direct connection 113 is included in the connection information (Table B), and determines that the connection is the wired LAN connection 112 otherwise. The CPU 201 moves the processing to step s621 when the CPU 201 determines that the connection is the wireless direct connection 113, and moves the processing to step s612 when the CPU 201 determines that the connection is the wired LAN connection 113.

In step s621, the CPU 201 switches the connection destination of the wireless communication unit 209 to the SSID/Passkey included in the NFC tag 111, and performs the wireless direct connection 113. Then, the CPU 201 enables the mobile terminal 100 and the printing device 110 to perform communication based on the network connection information acquired when reading the NFC tag 111 and the like, and performs communication with the printing device 110.

In step s612, the CPU 201 attempts connection to the printing device 110 with wired LAN information.

In step s613, the CPU 201 determines whether the mobile terminal 100 has been able to connect to the printing device 110 within a fixed time. The CPU 201 moves the processing to step s631 when the mobile terminal 100 connects with the printing device 110 within a fixed time, and moves the processing to step s614 when the mobile terminal 100 has not connected with the printing device 110 within a fixed time. In step s631, the CPU 201 performs communication with the printing device 110 through the wired LAN. Meanwhile, when the mobile terminal 100 is connected with a different wireless access point from the wireless access point 130, or the wireless communication unit 209 is stopped, the mobile terminal 100 cannot connect with the printing device 110 within a fixed time, and the processing moves to step s614.

Figure 7B:
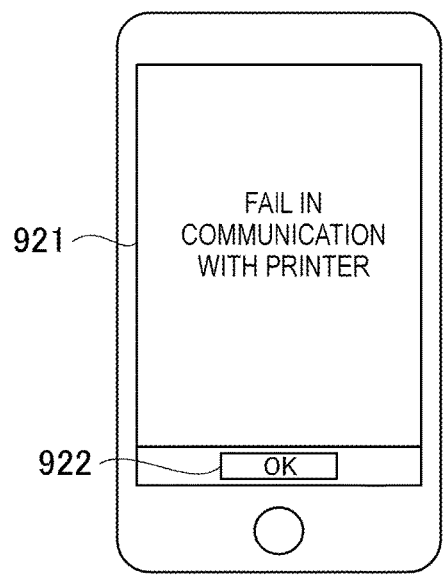
Figure 7C:
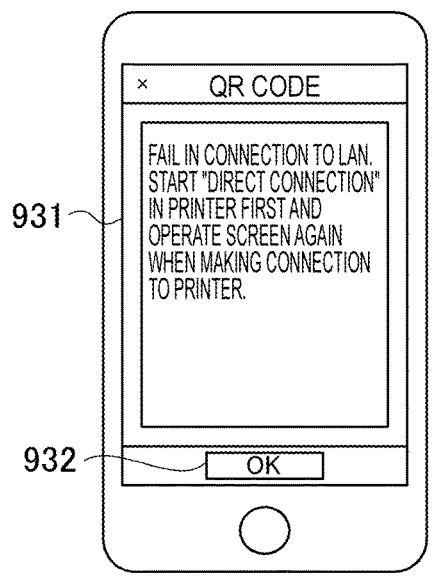

In step s614, the CPU 201 confirms a flag, dmode, which indicates an operation mode of wireless direct communication from the connection information acquired in step s610. When the dmode is 0 indicating that the wireless direct communication cannot be started, the printing device 110 cannot start the wireless direct connection 113 even if a user operation is made, and thus the CPU 201 moves the processing to step s615. In step s615, the CPU 201 displays an error screen on the control panel 205, as illustrated in FIG. 7B. FIG. 7B displays a message 921 notifying failure in connection to the printing device 110. When the dmode is 1 indicating that the wireless direct communication can be started, the connection can be made if the user operates the printing device 110 to make the wireless direct connection 113 effective, and thus the CPU 201 moves the processing to step s641. In step s641, the CPU 201 displays a message on the control panel 205, as illustrated in FIG. 7C. FIG. 7C displays a message 931 for notifying the user of failure in connection to the printing device 110 and for prompting the user to use the wireless direct connection 113. What user operation is made to have communication with the printing device 110 after the display of FIG. 7C is described below. The processing of steps s615 and s641 is an example of display control processing.

Figure 8A:
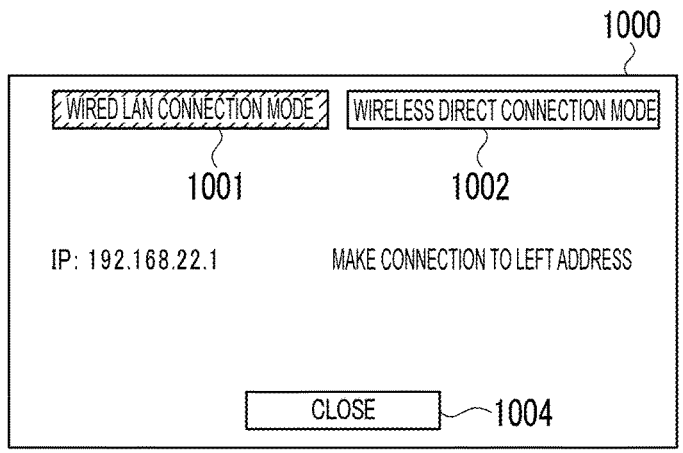
FIGS. 8A to 8C are diagrams illustrating examples of a screen of the printing device of the first exemplary embodiment.
Figure 8B:
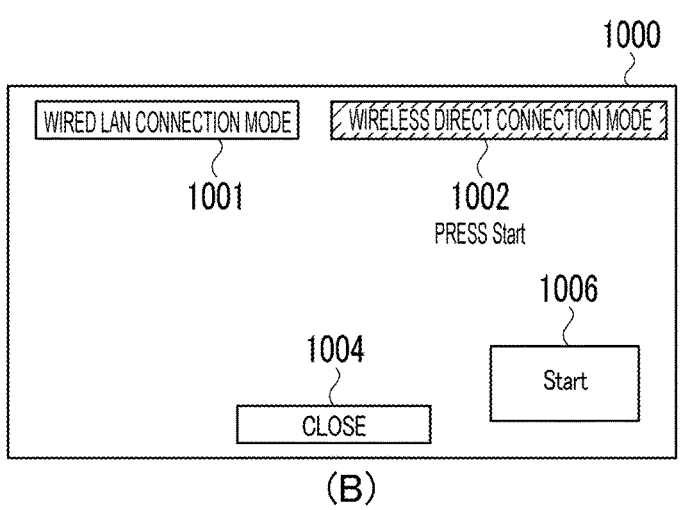
Figure 8C:
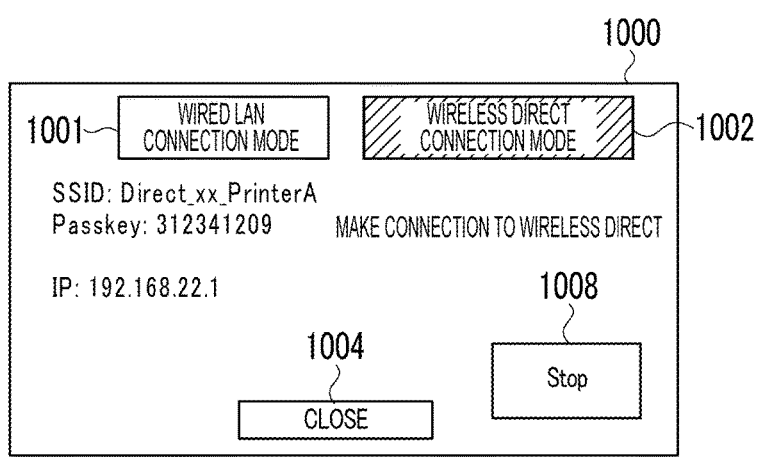

Examples of messages displayed in the operation unit 414 of the printing device 110 are illustrated in FIGS. 8A to 8C. There are two patterns of messages of FIG. 8A, including a case in which the dmode is 1 and a case in which the dmode is 0 as the information included in the NFC tag 111. The screen of FIG. 8A is an example of a message screen in a wired LAN connection mode. The screen of FIG. 8B is an example of a message screen in a case where the wireless direct communication is un-started. The screen of FIG. 8C is an example of a message screen in a case where the wireless direct communication is started.

Figure 9:
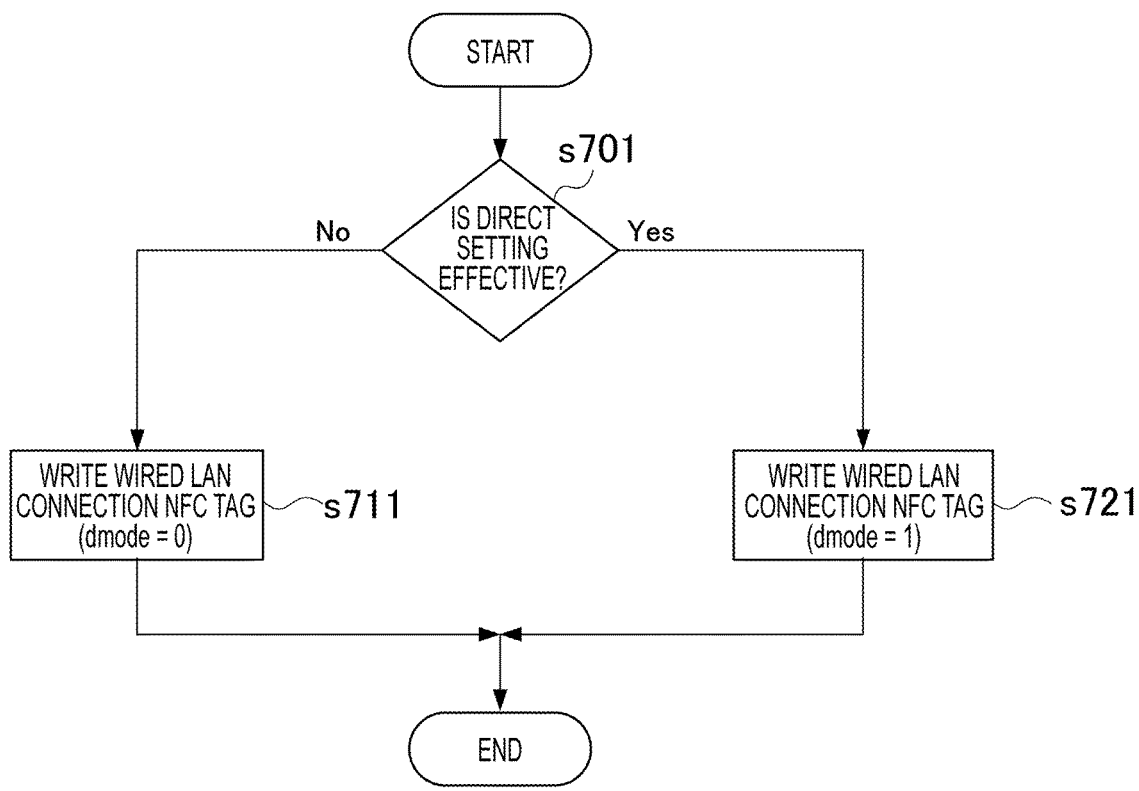
FIG. 9 is a flowchart illustrating an example of information processing of the printing device of the first exemplary embodiment.
Figure 11:
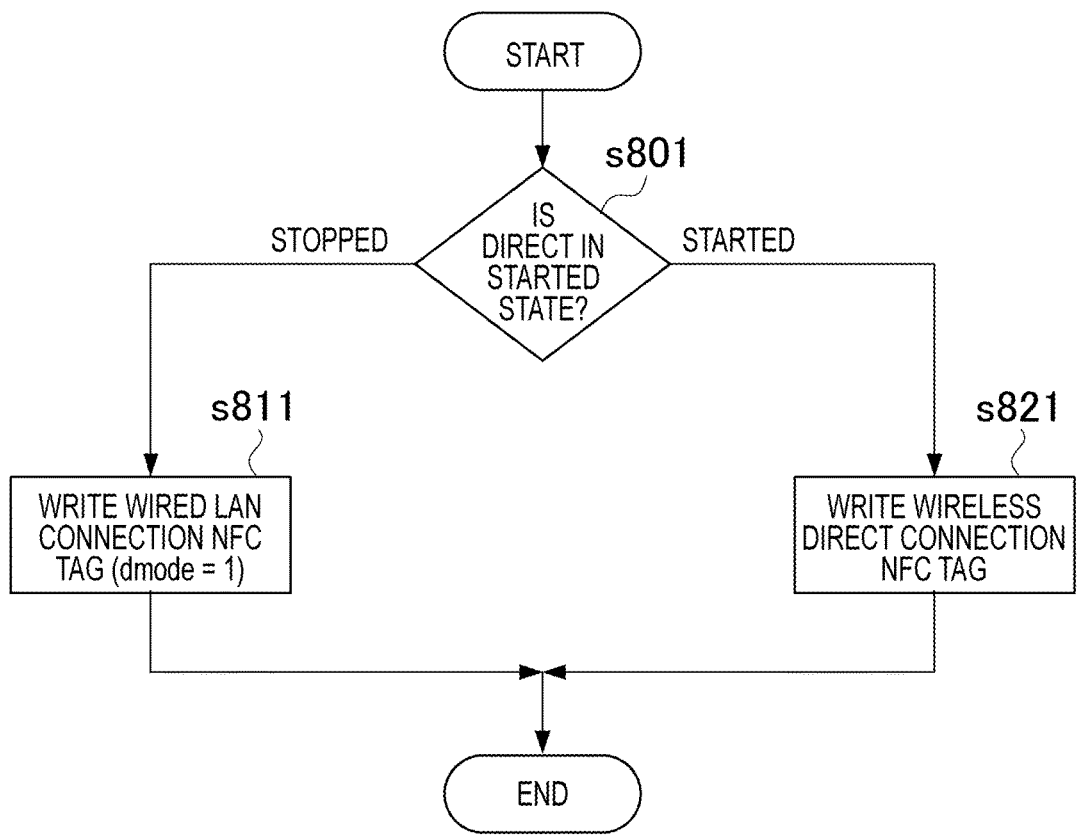
FIG. 11 is a flowchart illustrating an example of the information processing of the printing device of the first exemplary embodiment.

As described below, there are three patterns of information that can be written in the NFC tag 111. In the flowcharts of FIGS. 9 and 11 described below, processing to write information in the NFC tag 111 is divided into three patterns of four steps including step s711, steps s721 and s811 to write the same information, and step s821. The processing of the respective steps are described below.

FIG. 9 is a flowchart illustrating an example of information processing of writing the information in the NFC tag 111 when the printing device 110 is started in the first exemplary embodiment.

Figure 10:
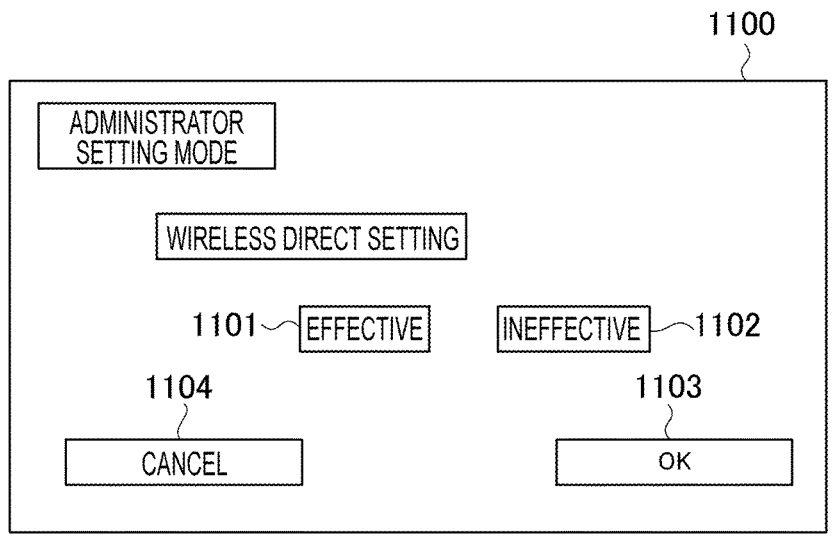
FIG. 10 is a diagram illustrating an example of a setting screen of the printing device of the first exemplary embodiment.

In step s701, the CPU 411 determines whether wireless direct setting is effective based on a flag of the wireless direct setting. The flag of the wireless direct setting is stored in the memory 416 of the controller unit 401 of the printing device 110, and includes information of effectiveness or ineffectiveness. The CPU 411 can set and change the information of effectiveness or ineffectiveness of the flag of the wireless direct setting based on a setting operation of the user through a setting screen 1100 of FIG. 10 of the operation unit 414 of the printing device 110. The CPU 411 moves the processing to step s721 when the wireless direct setting is effective, and moves the processing to step s711 when the wireless direct setting is ineffective.

In step s711, the CPU 411 writes, to the NFC tag 111, information indicating that the connection to the printing device 110 is connection through the wired LAN connection 112, and the wireless direct connection 113 is ineffective and cannot be used. More specifically, the CPU 411 writes the information of 0 in the dmode in the format of Table A. With this processing, the dmode=0 is established, and the mobile terminal 100 can acquire the information indicating that the wireless direct setting is ineffective by touching the NFC tag 111. Then, the CPU 411 terminates the processing of the flowchart illustrated in FIG. 9.

In step s721, the CPU 411 writes, to the NFC tag 111, information indicating that the connection to the printing device 110 is connection through the wired LAN connection 112 but the wireless direct connection 113 is available when a start operation is performed. More specifically, the CPU 411 writes the information of 1 in the dmode in the format of Table A. With this processing, the dmode=1 is established, and the mobile terminal 100 can acquire the information indicating that the wireless direct setting is effective by touching the NFC tag 111. Then, the communication being available if the user starts the wireless direct communication with the printing device 110 is notified when the user touches the NFC tag 111. Then, the CPU 411 terminates the processing of the flowchart illustrated in FIG. 9.

FIG. 11 is a flowchart illustrating an example of information processing of writing information to the NFC tag 111 by the printing device 110 in the first exemplary embodiment. The information is written based on a state when the wireless direct connection mode is switched by the user using a start button 1006 and a stop button 1008 on the screens illustrated in FIGS. 8B and 8C displayed on the operation unit 414 of the printing device 110.

In step s801, the CPU 411 determines whether the wireless direct connection 113 has started based on a start flag of the wireless direct connection 113. The start flag of the wireless direct connection 113 is stored in the memory 416 of the controller unit 401 of the printing device 110, and includes information of start or stop. The CPU 411 moves the processing to step s821 when the wireless direct connection 113 has started, and moves the processing to step s811 when the wireless direct connection 113 is stopped.

In step s811, the CPU 411 writes, to the NFC tag 111, information indicating that the connection to the printing device 110 is connection through the wired LAN connection 112 but the wireless direct connection 113 is available when a start operation is performed. More specifically, the CPU 411 writes the information of 1 in the dmode in the format of Table A. Here, with the dmode=1, the information indicating that the wireless direct setting is effective can be notified to the mobile terminal 100 when the NFC tag 111 is touched. Then, the communication being available if the user starts the wireless direct communication with the printing device 110 can be notified. Then, the CPU 411 terminates the processing of the flowchart illustrated in FIG. 11.

In step s821, the CPU 411 writes wireless direct connection information to the NFC tag 111 when the wireless direct connection is started. More specifically, the CPU 411 writes the information of the SSID and the Passkey with which the printing device 110 is operated as the wireless direct access point in the format of Table B. Then, the CPU 411 terminates the processing of the flowchart illustrated in FIG. 11.

With the above processing, the CPU 411 writes the information of the dmode=1 as illustrated in Table 1 to the NFC tag 111 in step s721 or s811 when the wireless direct setting of the printing device 110 is effective. Then, the user touches the NFC tag 111 with the mobile terminal 100. Then, the mobile terminal 100 does not have the information (SSID/Passkey) for connecting to the wireless direct connection 113 and thus fails in connection. As a result, the CPU 201 displays instructions to start the wireless direct connection 113 as illustrated in FIG. 7C on the mobile terminal 100 in step s641. With the processing, the user selects a wireless direct connection mode button 1002 displayed on the screen of FIG. 8B in the operation unit 414 of the printing device 110. Then, when the user selects a start button 1006 that starts the wireless direct connection 113, the printing device 110 starts the wireless direct connection function, and writes the content of Table 2 to the NFC tag 111 (step s821). Then, the user touches the NFC tag 111 with the mobile terminal 100 again, the mobile terminal 100 acquires the information (SSID/Passkey) for connecting to the wireless direct connection 113, and can be safely connected with the printing device 110 by the wireless direct connection 113.

Second Exemplary Embodiment

A second exemplary embodiment will be described as a modification of the first exemplary embodiment. In the first exemplary embodiment, the description has been made using the NFC as an example of proximity wireless communication. In the second exemplary embodiment, description will be given using Bluetooth® Low Energy capable of bidirectional communication as an example of proximity wireless communication. When the wireless direct setting is effective (the button 1101 of FIG. 10 has been selected), while the wireless direct connection 113 is started by the user operation in the first exemplary embodiment, start of wireless direct communication is indicated from Bluetooth® Low Energy using a bidirectional communication function in the present second exemplary embodiment. The description of FIGS. 3 and 5, which are common to the first exemplary embodiment, is omitted.

While the NFC tag 111 is integrated into the printing device 110 in the first exemplary embodiment, a Bluetooth® Low Energy module is integrated into, in place of the NFC tag 111, in the second exemplary embodiment, and the proximity wireless communication is established by the Bluetooth® Low Energy module.

Similarly, while the proximity wireless communication unit 208 performs the proximity wireless communication by the NFC in the first exemplary embodiment, communication is the proximity wireless communication by the Bluetooth® Low Energy in the second exemplary embodiment. The proximity wireless communication is established between a mobile terminal 100 and a printing device 110, and information can be exchanged.

While the proximity wireless communication unit 418 is the NFC tag 111 in the first exemplary embodiment, communication is the proximity wireless communication by the Bluetooth® Low Energy in the second exemplary embodiment.

Figure 12:
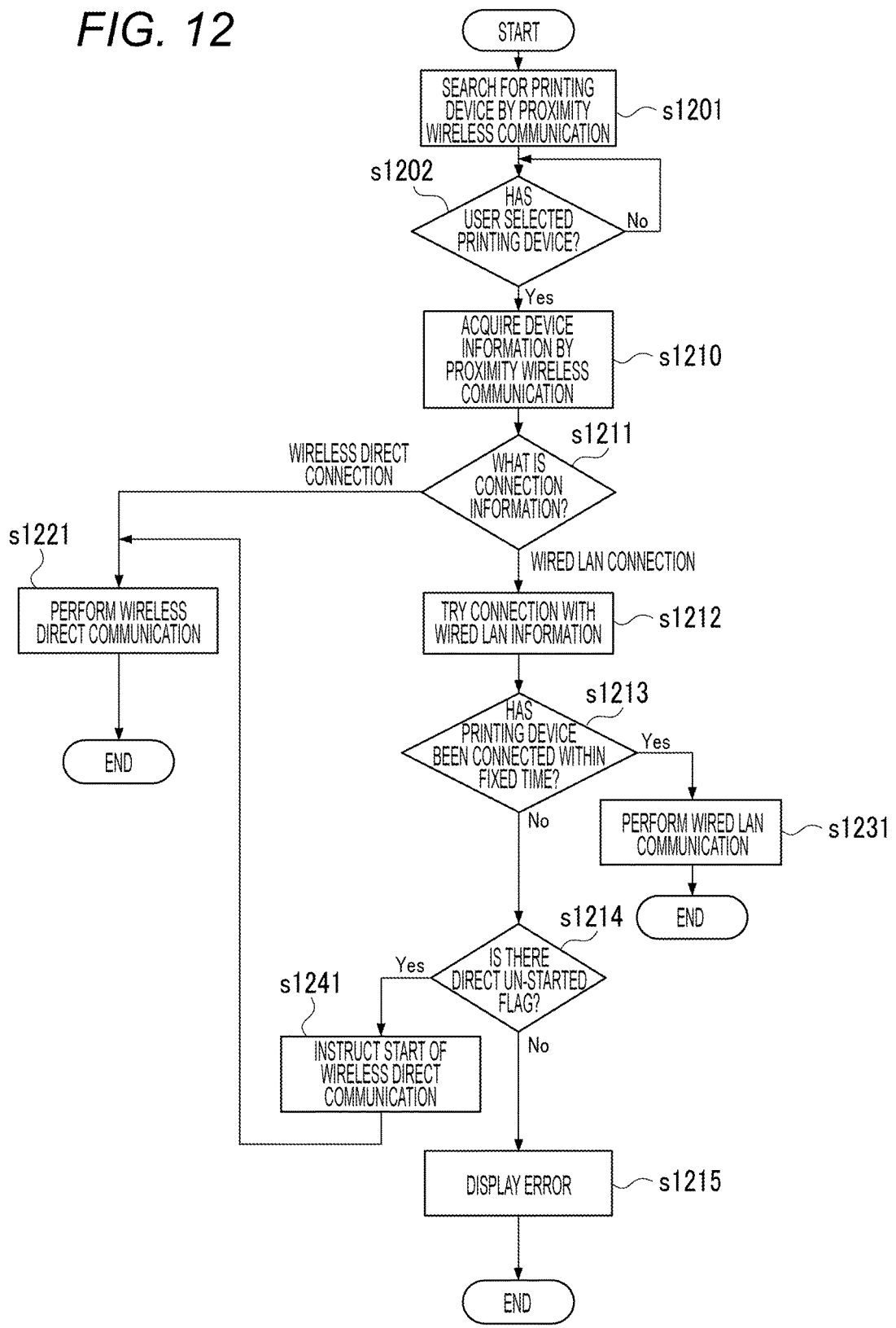
FIG. 12 is a flowchart illustrating an example of information processing of a mobile terminal of a second exemplary embodiment.

FIG. 12 is a flowchart illustrating an example of information processing of attempting connection to the printing device 110 by performing the proximity wireless communication between the mobile terminal 100 and the printing device 110 in the second exemplary embodiment.

When a print operation or the like is performed by a user, a CPU 201 searches for printing devices 110 near the mobile terminal 100, using the proximity wireless communication in step s1201, and displays a list of the found printing devices (FIG. 13A).

In step s1202, the CPU 201 stands by for selection of a wireless direct connection start button 1411 indicating the printing device 110 that the user wishes to use, on a screen of FIG. 13A displayed on a control panel 205. The CPU 201 moves the processing to step s1210 when the user selects the wireless direct connection start button 1411, and stands by for selection when the user has not selected the wireless direct connection start button 1411.

In step s1210, the CPU 201 performs the proximity wireless communication with the printing device 110 selected in step s1202, using the proximity wireless communication unit 208, inquires a state of wireless direct connection 113 of the printing device 110, and acquires device information (connection information) of the printing device 110.

In step s1211, the CPU 201 determines whether the connection information indicates wired LAN connection 112 or the wireless direct connection 113 from the connection information indicating a state of the wireless direct connection 113 acquired in step s1210. The CPU 201 moves the processing to step s1221 when the CPU 201 determines that the connection is the wireless direct connection 113, and moves the processing to step s1212 when the CPU 201 determines that the connection is the wired LAN connection 112.

The processing of step s1221 is processing of when the wireless direct connection 113 of the printing device 110 has been started. In step s1221, the CPU 201 acquires SSID/Passkey from the printing device 110, using the proximity wireless communication. Then, the CPU 201 switches the connection destination of the wireless communication unit 209 to the acquired SSID/Passkey, and performs the wireless direct connection 113 with the printing device 110. Then, the CPU 201 inquires an IP address of a wireless network of the printing device 110, using the proximity wireless communication. Then, the CPU 201 attempts connection to the inquired and acquired IP address to enable the mobile terminal 100 and the printing device 110 to perform communication, and performs communication with the printing device 110.

In step s1212, the CPU 201 attempts connection to the printing device 110 with wired LAN information. More specifically, the CPU 201 inquires an IP address of a wired network of the printing device 110, using the proximity wireless communication. Then, as a result of the inquiry, the CPU 201 attempts connection to the printing device 110 based on the acquired IP address.

In step s1213, the CPU 201 determines whether the connection to the printing device 110 has been made within a fixed time. The CPU 201 moves the processing to step s1231 when the connection to the printing device 110 has been made within a fixed time, and moves the processing to step s1214 when the connection to the printing device 110 cannot be made within a fixed time. In a case where the mobile terminal 100 previously connected with the wireless access point 130, the mobile terminal 100 can be connected to the IP address of the printing device 110, the IP address having been acquired in step s1212. In this case, the CPU 201 moves the processing to step s1231. In step s1231, the CPU 201 performs communication with the printing device 110 through a wired LAN. Meanwhile, in a case where the mobile terminal 100 connects with a different wireless access point from the wireless access point 130, or the wireless communication unit 209 is stopped, the mobile terminal 100 cannot be connected with the printing device 110. In this case, the CPU 201 moves the processing to step s1214.

In step s1214, the CPU 201 confirms a flag, dmode, which indicates an operation mode of the wireless direct communication from the connection information acquired in step s1210. When a flag dmode is 0, which indicates that the dmode cannot be started, the CPU 201 moves the processing to step s1215. In step s1215, the CPU 201 performs error display (FIG. 13B) because the printing device 110 cannot start the wireless direct connection 113 even if a user operation is performed. FIG. 13B displays a message 1421 indicating failure of connection to the printing device 110. When the flag dmode is 1, which indicates the dmode can be started, the CPU 201 moves the processing to step s1241. In step s1241, the CPU 201 makes the wireless direct connection 113 of the printing device 110 effective through the proximity wireless communication. More specifically, the CPU 201 instructs start of a wireless direct connection function of the printing device 110 through the proximity wireless communication, using the proximity wireless communication unit 208. Then, the CPU 201 moves the processing to step s1221, and performs communication with the printing device 110 by the wireless direct communication.

Figure 14:
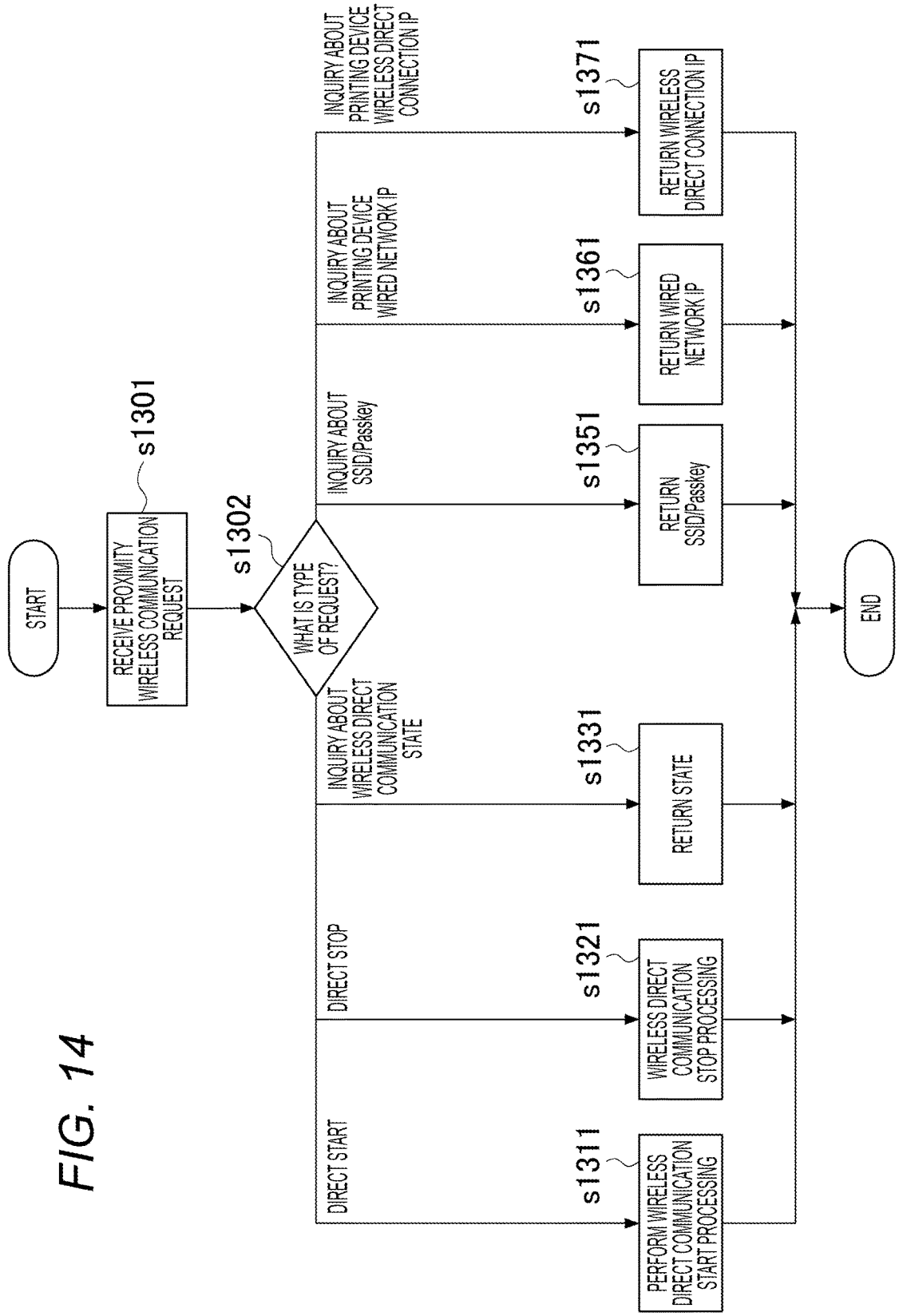
FIG. 14 is a flowchart illustrating an example of information processing of a printing device of the second exemplary embodiment.

FIG. 14 is a flowchart illustrating an example of information processing of the printing device 110 in response to a request of the proximity wireless communication from the mobile terminal 100 in the second exemplary embodiment.

In step s1301, a CPU 411 receives a processing request of the proximity wireless communication from the mobile terminal 100.

In step s1302, the CPU 411 enables the processing to branch to step s1311 to s1371 below according to a type of the request received in step s1301.

In a case of a start request of the wireless direct connection 113, the CPU 411 starts the wireless direct connection function in step s1311. Then, the CPU 411 terminates the processing of the flowchart illustrated in FIG. 14.

In a case of a stop request of the wireless direct connection 113, the CPU 411 stops the wireless direct connection function in step s1321. Then, the CPU 411 terminates the processing of the flowchart illustrated in FIG. 14.

In a case of an inquiry about a wireless direct connection state, the CPU 411 returns a current state of the wireless direct connection function to the mobile terminal 100 as a request sender, using the proximity wireless communication, in step s1331. As returned content, information about being stopped and already started, and flag information (1 or 0) whether wireless direct setting is effective, which corresponds to the dmode of the first exemplary embodiment in the case of being stopped, are returned. Then, the CPU 411 terminates the processing of the flowchart illustrated in FIG. 14.

In a case of an inquiry about SSID/Passkey, the CPU 411 returns the current SSID/Passkey of the wireless direct connection function to the mobile terminal 100 as the request sender, using the proximity wireless communication, in step s1351. Then, the CPU 411 terminates the processing of the flowchart illustrated in FIG. 14.

In a case of an inquiry about a printing device wired network IP, the CPU 411 returns the current IP address of a wired network I/F 421 to the mobile terminal 100 as the request sender, using the proximity wireless communication, in step s1361. Then, the CPU 411 terminates the processing of the flowchart illustrated in FIG. 14.

In a case of an inquiry about a printing device wireless direct connection IP, the CPU 411 returns the current IP address of the wireless direct connection 113 to the mobile terminal 100 as the request sender, using the proximity wireless communication, in step s1371. Then, the CPU 411 terminates the processing of the flowchart illustrated in FIG. 14.

With the above processing, the mobile terminal 100 can automatically connect with the wireless direct communication, using the proximity wireless communication, even if the wired LAN connection of the printing device 110 is not available and the wireless direct connection 113 is stopped.

Another Exemplary Embodiment

Additional exemplary embodiments supply the program that realizes one or more functions of the above-described exemplary embodiments to a system or a device through a network or a storage medium. The one or more functions can be realized by processing in which one or more processors in a computer of the system or the device read and execute the program. The one or more functions can be realized by a circuit (for example, an ASIC) that realizes one or more functions.

The above-described exemplary embodiment are not seen to be limiting.

According to the processing of the above-described exemplary embodiments, the information whether the wireless direct connection can be started is stored in proximity wireless communication information, and when the connection fails although the wireless direct connection can be started, the fact is notified to the user. With the notification, the user can understand connection means by simply seeing the display on the mobile terminal.

Therefore, a technology to notify the user of start of the wireless direct connection can be provided.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-148703, filed Jul. 28, 2016, which is hereby incorporated by reference herein in its entirety.

What is claimed is:

1. A mobile terminal comprising:
a memory that stores a program; and
a processor that executes the program to cause the mobile terminal to:
acquire communication information from an external device via first proximity wireless communication, wherein the communication information includes connection information and mode information in a case where the external device does not start a wireless direct connection function, and wherein the connection information is information used for connecting to the external device via second communication other than the first proximity wireless communication, and wherein the mode information indicates whether the wireless direct connection function is available or not;
attempt to connect to the external device via the second communication using the connection information included in the acquired communication information;
display a first message in a case where the connection attempt fails and where the mode information included in the acquired communication information indicates that the wireless direct connection function is available, wherein the displayed first message is a message for notifying a user of failure in the connection via the second communication and for prompting the user to start the wireless direct connection function of the external device; and
display a second message in a case where the connection attempt fails and where the mode information included in the acquired communication information indicates that the wireless direct connection function is not available, wherein the displayed second message is a message for notifying the user of failure in the connection via the second communication, and wherein the displayed second message does not include a message for prompting the user to start the wireless direct connection function of the external device.

2. The mobile terminal according to claim 1,
wherein the first proximity wireless communication is wireless communication based on NFC, and
wherein the mobile terminal acquires the communication information from an NFC tag of the external device.

3. The mobile terminal according to claim 1, wherein the wireless direct connection function is a function where the external device itself serves as a wireless access point of a wireless direct connection.

4. A mobile terminal comprising:
a memory that stores a program; and
a processor executes the program to cause the mobile terminal to:
acquire communication information from an external device via first proximity wireless communication wherein the communication information includes connection information and mode information in a case where the external device does not start a wireless direct connection function, and wherein the connection information is information used for connecting to the external device via second communication other than the first proximity wireless communication, and wherein the mode information indicates whether the wireless direct connection function is available or not;
attempt to connect to the external device via the second communication using the connection information included in the acquired communication information;
instruct start of the wireless direct connection function of the external device via the first proximity wireless communication to the external device in a case where the connection attempt fails and where the mode information included in the acquired communication information indicates that the wireless direct connection function is available; and
display a second message in a case where the connection attempt fails and where the mode information included in the acquired communication information indicates that the wireless direct connection function is not available, wherein the displayed second message is a message for notifying a user of failure in the connection via the second communication.

5. The mobile terminal according to claim 3,
wherein the proximity wireless communication is wireless communication based on Bluetooth® Low Energy.

6. The mobile terminal according to claim 4,
wherein the wireless direct connection function is a function where the external device itself serves as a wireless access point of a wireless direct connection.

7. The mobile terminal according to claim 6, wherein an administrator of the external device sets, on a setting screen of the external device, whether or not the user of the mobile terminal can operate the external device so that the external device itself serves as the wireless access point of the wireless direct communication.

8. A method of controlling a mobile terminal, the method comprising:
 acquiring communication information from an external device via first proximity wireless communication wherein the communication information includes connection information and mode information in a case where the external device does not start a wireless direct connection function, and wherein the connection information is information used for connecting to the external device via second communication other than the first proximity wireless communication, and wherein the mode information indicates whether the wireless direct connection function is available or not;
 attempting to connect to the external device via the second communication using the connection information included in the acquired communication information;
 displaying a first message in a case where the connection attempt fails and where the mode information included in the acquired communication information indicates that the wireless direct connection function is available, wherein the displayed first message is a message for notifying a user of failure in the connection via the second communication and for prompting the user to start the wireless direct connection function of the external device; and
 displaying a second message in a case where the connection attempt fails and where the mode information included in the acquired communication information indicates that the wireless direct connection function is not available, wherein the displayed second message is a message for notifying the user of failure in the connection via the second communication, and wherein the displayed second message does not include a message for prompting the user to start the wireless direct connection function of the external device.

9. The method of controlling a mobile terminal according to claim 8,
 wherein the first proximity wireless communication is wireless communication based on NFC, and
 wherein the mobile terminal acquires the communication information from an NFC tag of the external device.

10. A method of controlling a mobile terminal, the method comprising:
 acquiring communication information from an external device via first proximity wireless communication wherein the communication information includes connection information and mode information in a case where the external device does not start a wireless direct connection function, and wherein the connection information is information used for connecting to the external device via second communication other than the first proximity wireless communication, and wherein the mode information indicates whether the wireless direct connection function is available or not;
 attempting to connect to the external device via the second communication using the connection information included in the acquired communication information; and
 instructing start of the wireless direct connection function of the external device via the first proximity wireless communication to the external device in a case where the connection attempt fails and where the mode information included in the acquired communication information indicates that the wireless direct connection function is available; and
 displaying a second message in a case where the connection attempt fails and where the mode information included in the acquired communication information indicates that the wireless direct connection function is not available, wherein the displayed second message is a message for notifying a user of failure in the connection via the second communication.

11. The method of controlling a mobile terminal according to claim 10,
 wherein the proximity wireless communication is wireless communication based on Bluetooth® Low Energy.

12. A computer-readable storage medium storing computer executable instructions for causing a computer to execute a method of controlling a mobile terminal, the method comprising:
 acquiring communication information from an external device via first proximity wireless communication, wherein the communication information includes connection information and mode information in a case where the external device does not start a wireless direct connection function, and wherein the connection information is information used for connecting to the external device via second communication other than the first proximity wireless communication, and wherein the mode information indicates whether the wireless direct connection function is available or not;
 attempting to connect to the external device via the second communication using the connection information included in the acquired communication information;
 displaying a first message in a case where the connection attempt fails and where the mode information included in the acquired communication information indicates that the wireless direct connection function is available, wherein the displayed first message is a message for notifying a user of failure in the connection via the second communication and for prompting the user to start the wireless direct connection function of the external device; and
 displaying a second message in a case where the connection attempt fails and where the mode information included in the acquired communication information indicates that the wireless direct connection function is not available, wherein the displayed second message is a message for notifying the user of failure in the connection via the second communication, and wherein the displayed second message does not include a message for prompting the user to start the wireless direct connection function of the external device.

13. A computer-readable storage medium storing computer executable instructions for causing a computer to execute a method of controlling a mobile terminal, the method comprising:
 acquiring communication information from an external device via first proximity wireless communication wherein the communication information includes connection information and mode information in a case where the external device does not start a wireless direct connection function, and wherein the connection information is information used for connecting to the external device via second communication other than the first proximity wireless communication, and wherein the mode information indicates whether the wireless direct connection function is available or not;

attempting to connect to the external device via the second communication using the connection information included in the acquired communication information; and instructing start of the wireless direct connection function of the external device via the first proximity wireless communication to the external device in a case where the connection attempt fails and where the mode information included in the acquired communication information indicates that the wireless direct connection function is available; and displaying a second message in a case where the connection attempt fails and where the mode information included in the acquired communication information indicates that the wireless direct connection function is not available, wherein the displayed second message is a message for notifying a user of failure in the connection via the second communication.

14. A mobile terminal comprising:

a memory that stores a program; and a processor that executes the program to cause the mobile terminal to:

acquire connection information and mode information from an external device via first proximity wireless communication when the external device itself is not serving as a wireless access point of a wireless direct communication, wherein the connection information is information used for connecting to the external device via second communication that is different from both of the first proximity wireless communication and the wireless direct communication, and wherein the mode information indicates whether or not a user of the mobile terminal can operate the external device so that the external device itself serves as the wireless access point of the wireless direct communication;

attempt to connect to the external device via the second communication using the acquired connection information;

display a first message in a case where the connection attempt fails and where the acquired mode information indicates that the user can operate the external device so that the external device itself serves as the wireless access point of the wireless direct communication, wherein the displayed first message is a message for notifying a user of failure in the connection via the second communication and for prompting the user to operate the external device so that the external device itself serves as the wireless access point of the wireless direct communication; and display a second message in a case where the connection attempt fails and where the acquired mode information indicates that the user cannot operate the external device so that the external device itself serves as the wireless access point of the wireless direct communication, wherein the displayed second message is a message for notifying the user of failure in the connection via the second communication, and wherein the displayed second message does not include a message for prompting the user to operate the external device so that the external device itself serves as the wireless access point of the wireless direct communication.

15. A computer-readable storage medium storing computer executable instructions for causing a computer to execute a method of controlling a mobile terminal, the method comprising:

acquiring connection information and mode information from an external device via first proximity wireless communication when the external device itself is not serving as a wireless access point of a wireless direct communication, wherein the connection information is information used for connecting to the external device via second communication that is different from both of the first proximity wireless communication and the wireless direct communication, and wherein the mode information indicates whether or not a user of the mobile terminal can operate the external device so that the external device itself serves as the wireless access point of the wireless direct communication;

attempting to connect to the external device via the second communication using the acquired connection information;

displaying a first message in a case where the connection attempt fails and where the acquired mode information indicates that the user can operate the external device so that the external device itself serves as the wireless access point of the wireless direct communication, wherein the displayed first message is a message for notifying a user of failure in the connection via the second communication and for prompting the user to operate the external device so that the external device itself serves as the wireless access point of the wireless direct communication; and displaying a second message in a case where the connection attempt fails and where the acquired mode information indicates that the user cannot operate the external device so that the external device itself serves as the wireless access point of the wireless direct communication, wherein the displayed second message is a message for notifying the user of failure in the connection via the second communication, and wherein the displayed second message does not include a message for prompting the user to operate the external device so that the external device itself serves as the wireless access point of the wireless direct communication.

* * * * *